(12) United States Patent
Alshafai

(10) Patent No.: US 9,714,073 B2
(45) Date of Patent: Jul. 25, 2017

(54) UNDERWATER PROPULSION BELT

(71) Applicant: Ali Salman Alshafai, San Antonio, TX (US)

(72) Inventor: Ali Salman Alshafai, San Antonio, TX (US)

( * ) Notice: Subject to any disclaimer, the term of this patent is extended or adjusted under 35 U.S.C. 154(b) by 38 days.

(21) Appl. No.: 14/922,850

(22) Filed: Oct. 26, 2015

(65) Prior Publication Data

US 2017/0113766 A1    Apr. 27, 2017

(51) Int. Cl.
*B63C 11/02*  (2006.01)
*A63B 35/08*  (2006.01)
*G05D 7/06*   (2006.01)

(52) U.S. Cl.
CPC ......... *B63C 11/02* (2013.01); *A63B 35/08* (2013.01); *G05D 7/0682* (2013.01)

(58) Field of Classification Search
CPC ..................................................... A63B 35/12
See application file for complete search history.

(56) References Cited

U.S. PATENT DOCUMENTS

| | | | | |
|---|---|---|---|---|
| 3,329,118 A | * | 7/1967 | Strader | A63B 35/12 |
| | | | | 114/315 |
| 3,916,814 A | * | 11/1975 | Bardoni | A63B 35/12 |
| | | | | 114/315 |
| 5,158,034 A | * | 10/1992 | Hsu | B63C 11/46 |
| | | | | 114/315 |
| 5,509,372 A | * | 4/1996 | Culotta | B63C 11/46 |
| | | | | 114/315 |
| 7,124,701 B2 | | 10/2006 | Valente | |
| 2012/0128425 A1 | | 5/2012 | Walck | |
| 2014/0069422 A1 | | 3/2014 | Stood et al. | |

FOREIGN PATENT DOCUMENTS

| | | |
|---|---|---|
| CN | 103806484 A | 5/2014 |
| CN | 203975183 U | 12/2014 |
| GB | 2367478 A | 4/2002 |

\* cited by examiner

*Primary Examiner* — Edwin Swinehart
(74) *Attorney, Agent, or Firm* — Oblon, McClelland, Maier & Neustadt, L.L.P.

(57) ABSTRACT

An underwater propulsion belt that propels a user underwater and includes a plurality of gates, each gate has a channel. A pump is found in each gate and is controlled independently form the other gates. A power supply powers the pumps to pump water in either direction through the channel. The underwater propulsion belt further includes circuitry configured to receive diver information from the user and from one or more sensors. The underwater propulsion belt controls, based on the information, the movement of the user. The user's position is calculated based on whether the user is in an upright or prone position, and maintains, based on the calculation, the user's balance.

16 Claims, 5 Drawing Sheets

UNDERWATER PROPULSION BELT

BACKGROUND

The present disclosure is directed to the field of SCUBA (Self-Contained Underwater Breathing Apparatus) diving and propelling a diver underwater. SCUBA divers use a variety of equipment in their diving experience.

SUMMARY

In selected embodiments, an underwater propulsion belt propels a user underwater and includes a plurality of gates, each gate having a first end and a second end with a channel therebetween, the first end and the second of each gate being offset from each other. A plurality of pumps are controlled independently from one another, each pump of the plurality of pumps having a corresponding gate. A power supply powers the plurality of pumps to pump water from either direction in the channel, either from the first end to the second end or from the second end to the first end. The underwater propulsion belt further includes circuitry configured to receive diver information from the user and from one or more sensors. The underwater propulsion belt controls, based on the information, the direction in which the water is pumped in each of the channels, the number of pumps in operation, and a speed at which the water is pumped in each of the channels, to execute movement of the user. The user's position is calculated based on whether the user is in an upright or prone position, and controls, based on the calculation, the direction the in which water is pumped in each of the channels, the number of pumps in operation, and the speed at which the water is pumped in each of the channels, to maintain the user's balance.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
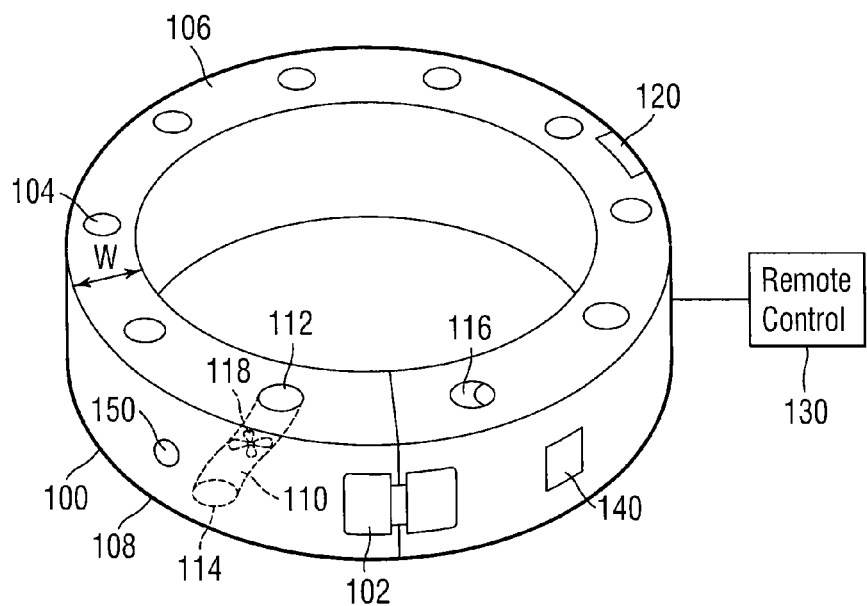
FIG. 1 illustrates an underwater propulsion belt according to one example.

A more complete appreciation of the present advancements and many of the attendant advantages thereof will be readily obtained as the same becomes better understood by reference to the following detailed description when considered in connection with the accompanying drawings. However, the accompanying drawings and their exemplary depictions do not in any way limit the scope of the advancements embraced by the specification. The scope of the advancements embraced by the specification and drawings are defined by the words of the accompanying claims.

Selected embodiments are now described by referring now to the drawings, wherein like reference numerals designate identical or corresponding parts throughout the several views. It is noted that as used in the specification and the appending claims, the singular forms "a," "an," and "the" can include plural references unless the context clearly dictates otherwise.

FIG. 1 illustrates an underwater propulsion belt 100 that is used during underwater diving. The underwater propulsion belt 100 is an additional piece of equipment that can be used in conjunction with other diving equipment, such as a buoyancy control device (BCD), dry suit, wet suit, mask, air cylinders, fins, snorkel, etc., to supplement the diver's underwater experience. The underwater propulsion belt 100 can be separate piece of equipment, or alternatively, the underwater propulsion belt 100 can be integrated with other diving equipment, such as the BCD.

The underwater propulsion belt 100 includes a fastener 102, enabling the underwater propulsion belt 100 to be attached to a user around, for example, the waist area. The underwater propulsion belt 100 has a substantially toroid shape with a substantially rectangular cross section when fastened to the user. In addition, the underwater propulsion belt 100 can further include a plurality of straps (not shown) to secure the underwater propulsion belt 100 to the user, forming a harness.

The underwater propulsion belt 100 can include a plurality of gates 104 that extend from a first end 106 of the underwater propulsion belt 100 to a second end 108 of the underwater propulsion belt 100, i.e., the top and the bottom of the underwater propulsion belt 100. In one example, the gates 104 are aligned with a longitudinal direction of the user. The first end 106 and the second end 108 have a predetermined width "w" that is larger than the diameter of the plurality of gates 104. An exemplary gate includes a first gate end 112 and a second gate end 114 with a channel 110 therebetween. The second gate end 114 and the channel 110 are illustrated in FIG. 1 with hidden lines. The gates illustrated in FIG. 1 have a substantially circular cross section; however, various other shapes may be used. The height of the underwater propulsion belt 100 is greater than the width "w" of the first end 106 and the second end 108, which creates a longer channel 110 and enables additional force to be created by the underwater propulsion belt 100.

Each gate end has an aperture 116 that controls the size of the gate ends, enabling each gate end to widened or narrow during use of the underwater propulsion belt 100. Each aperture can be controlled independently or in conjunction with other apertures. The apertures become wider or narrower during use depending on the situation.

The underwater propulsion belt 100 creates movement by generating propulsion by pumping water through the gates from one end to the other end. The propulsion system creates sufficient force to move the user in a desired direction. The number of gates and the size of the plurality of gates on the underwater propulsion belt 100 are dependent on the amount of force the underwater propulsion belt 100 needs to generate. For example, the number of gates and the size of each gate could be dependent upon the waist size of the user, the weight of the user, etc. The number of gates and the sizes of the gates are designed in order to produce sufficient water velocity and force to move the user through the water, and maintain the user's balance.

Each gate has a pump system to pump water either direction through the channel 110. The pumps for each gate can be controlled independently or in conjunction with other pumps. For example, the pump can pump water from the first gate end 112 to the second gate end 114 through the channel 100. Alternatively, the pump can pump water from the second gate end 114 to the first gate end 112 through the channel 110. This system enables the user to move forward and backward or up and down depending on the orientation of the user.

In one example, the pump system is an impeller 118 that is located in the channel 110. The impeller 118 can be located substantially in the middle of the channel 110. The impeller 118 has a plurality of blades that spin to pump water. The impeller 118 sucks water in from one end of the channel 110 and pumps it out the other end of the channel 118. The impeller 118 can rotate in both directions, which allows water to be pumped in both directions through the channel 110. The pitch of the blades contributes to the force created by the water through the channels, and the pitch of the blades can be adjusted during use of the underwater propulsion belt 100. The impeller 118 can be powered by a number of different methods, such as a belt, a shaft, gears, electromagnetic, etc.

The underwater propulsion belt 100 further includes a power source 120. The power source 120 may be integral with the underwater propulsion belt 100, alternatively, the power source 120 may be located at a different location on the user with a power cord to deliver power to the underwater propulsion belt 100. The power source 120 is contained in a watertight container. Various types of known power sources may be used, such as rechargeable batteries. The power source 120 powers the impellers 118 in each channel 110 independently of the other impellers.

Further, the underwater propulsion belt 100 may include a remote control 130. The remote control 130 enables the user to control the movement and speed of the underwater propulsion belt 100. Specifically, the user can control their lateral, vertical, and rotational movement by adjusting the speed of the impellers 118 and the rotational direction of the impellers 118 in the channels 110. The remote control 130 may be wired directly to underwater propulsion belt 100 or alternatively the remote control 130 could function remotely through an acoustic modem. The remote control 130 can be controlled by the user or alternatively by a third party, such as a dive master.

The remote control 130 may further be adapted to accommodate persons with physical disabilities. Specifically, the remote control 130 could be adapted for a person with limb aplasia, hypoplasia, or other physical disabilities. The remote control 130 may be controlled by a part of the body of user with which they have maximal dexterity. For example, the remote control 130 may be controlled by hands or feet.

Figure 2:
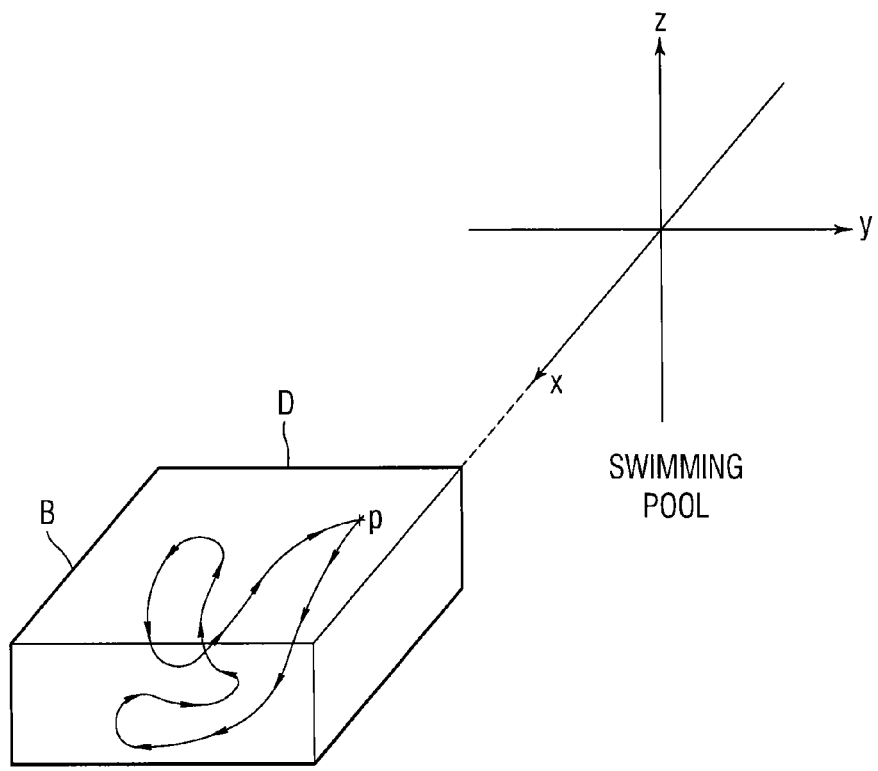
FIG. 2 illustrates an exemplary predetermined route executed by the underwater propulsion belt according to one example.

The underwater propulsion belt further includes a programmable chip 140. The programmable chip 140 enables a dive plan to be programmed on the chip 140 to enable the underwater propulsion belt 100 to carry out the specific dive plan. FIG. 2 illustrates an exemplary dive plan or predetermined route. The predetermined route includes diving underwater, rotating the user to a prone position, and moving the user in lateral, vertical, and rotational movements. In the example illustrated in FIG. 2, the user's starting and ending position is P, with the arrows along the path illustrating the movement of the user during the route. The pool's dimensions are illustrated by "B" and "D." The predetermined route may be based on a swimming pool in which the dimensions are known and programmed into the chip. Alternatively, the predetermined route may be based on a body of water diving trip, and global positioning system (GPS) technology is used to implement the predetermined route.

The underwater propulsion belt 100 further includes an emergency system to alert the user of certain situations. For example, if the power source 140 has low battery, an alert can be sent to the user. The alert can be visual, audio, or tactile, to alert the user of the low battery.

Alternatively, if the user is having trouble breathing, or begins to panic, the user may press an emergency button 150, and the underwater propulsion belt 100 will end the predetermined route or override the remote control and bring the user safely to the surface. The underwater propulsion belt 100 is programmed to take the user to the surface by a predetermined rate of ascension, as ascending too quickly can cause nitrogen narcosis, decompression sickness, or lung overexpansion. In addition, if the underwater propulsion belt 100 is integral with the BCD, a signal may be sent to inflate a bladder within the BCD to increase the buoyancy of the user and take the user to the surface by the predetermined rate of ascension.

Figure 3:
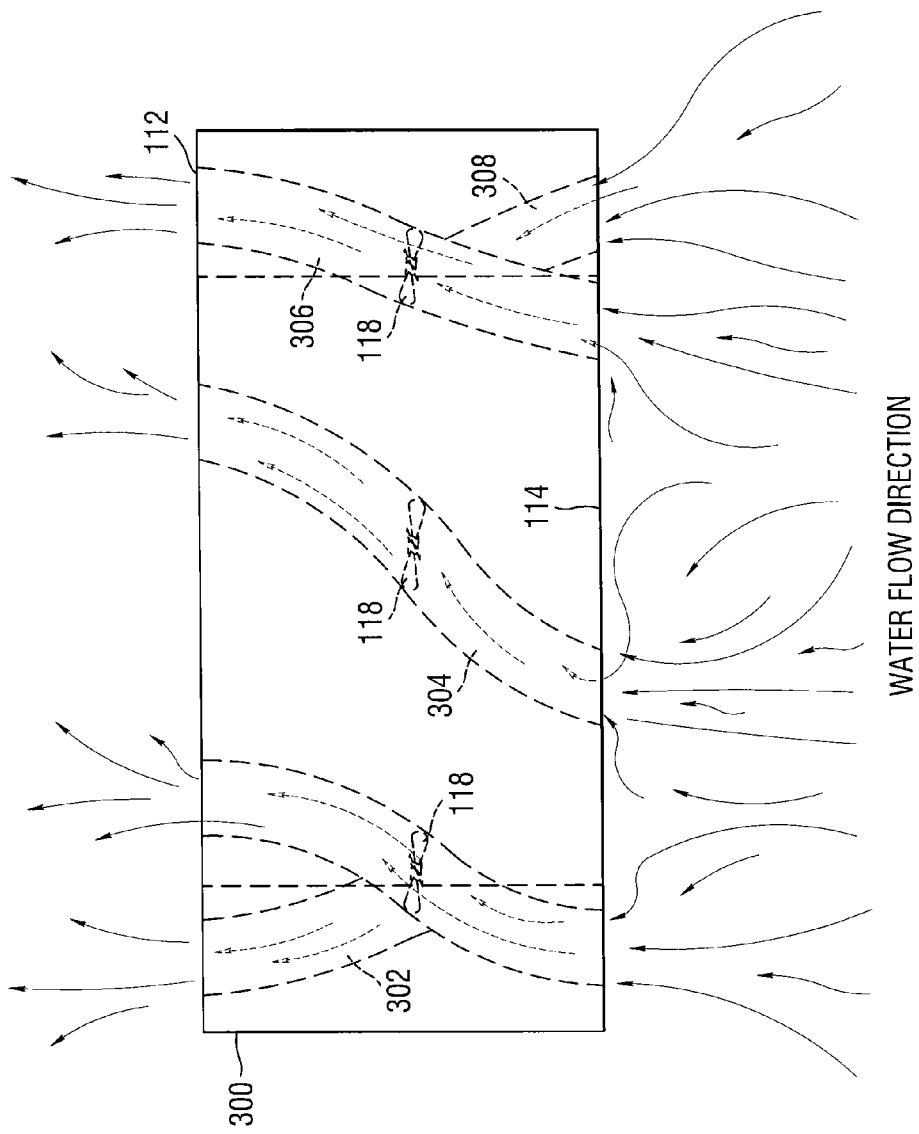
FIG. 3 illustrates a side view of the underwater propulsion belt and water flowing through channels in the underwater propulsion belt according to one example.

FIG. 3 illustrates a side view of the underwater propulsion belt 100. Each gate has a channel between the respective gate ends. FIG. 3 illustrates various channels 302, 304, 306, and 308 with hidden lines. The channels 302, 304, 306, and 308 extend through the underwater propulsion belt 100 from the first gate end 112 and the second gate end 114. The shape of the channels in the underwater propulsion belt 100 may have various shapes. For example, as illustrated in FIG. 3, the channel 304 curves from the first gate end 112 to the second gate end 114. Then again, the channel 304 can curve the opposite direction. Therefore, the first gate end 112 does not vertically align with the second gate end 114, but are offset from each other. Additional examples of the alignment of the channels may include a straight channel with offset gate ends, a straight channel with aligning gate ends, etc.

FIG. 3 further illustrates water flow through the gates to create the force necessary to move the user. As discussed above, the underwater propulsion belt 100 utilizes the movement of the water from the first gate end 112 to the second gate 114 through the channel 110 via the pump, or visa-versa, as the water can flow in either direction. The arrows in FIG. 3 represent water flowing from the second end 114 to the first end 112. As the water can flow in both directions, the belt is able to move the user forward, backward, up and down.

Figure 4:
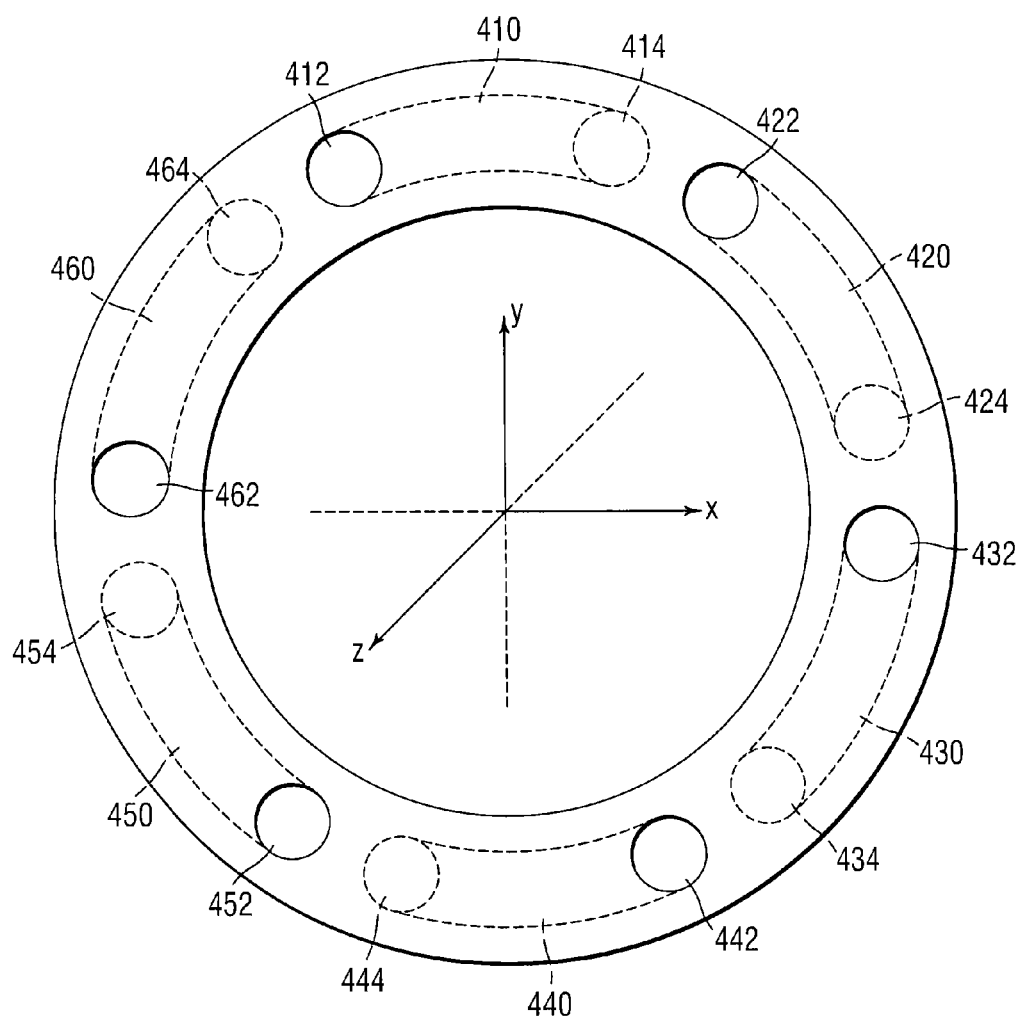
FIG. 4 illustrates a top view of the underwater propulsion belt with a plurality of gates according to one example.

In addition, the underwater propulsion belt 100 can also rotate the user. FIG. 4 illustrates a top view of the underwater propulsion belt 100 with six different gates according to one example. Each gate has a channel 410, 420, 430, 440, 450, and 460, which are illustrated with hidden lines. Each gate also has a first gate end 412, 422, 432, 442, 452, and 462 and a second gate end 414, 424, 434, 444, 454, and 464, the second gate ends being illustrated with hidden lines. Rotation is achieved through the process of turning on and off certain gates and managing the direction of the water flow through the gates via the pumps. For example, rotation is achieved by having the pumps to all the gates turned off, and then turning on the pumps to two adjacent gates, for example 420 and 430, and having the flow from the first gate ends 422 and 432 to the second gate ends 424 and 434.

Rotation may also be achieved by having all the gates turned off and then turning on the pumps to two adjacent gates to flow in one direction and simultaneously turning on the pumps for opposite adjacent gates and have the water flow in the opposite direction. For example, the pumps for gates 420 and 430 could be turned on to pump water from the first gate ends 422 and 432 to the second gate ends 424 and 434 and simultaneously turning on the pumps for the opposing gates 450 and 460 and pump water in the opposite direction from the second gate ends 454 and 464 to the first gate ends 452 and 462.

The above-noted examples are merely examples and the gates on the underwater propulsion belt 100 may be used in a variety of ways to manage the lateral, vertical, and rotational movement of the user through the use of the various gates and the pumping of water through the gates in either direction.

The underwater propulsion belt 100 further includes a self-balance control system. The purpose of the control system is to be able to maintain the balance of the user while underwater. The underwater propulsion belt 100 includes an accelerometer for determining the orientation of the user underwater. The underwater propulsion belt 100 can adjust the balance of the user by using the various gates on the underwater propulsion belt 100. If the user's movement offsets the user's balance, the underwater propulsion belt 100 adjusts the user's balance.

Figure 5:
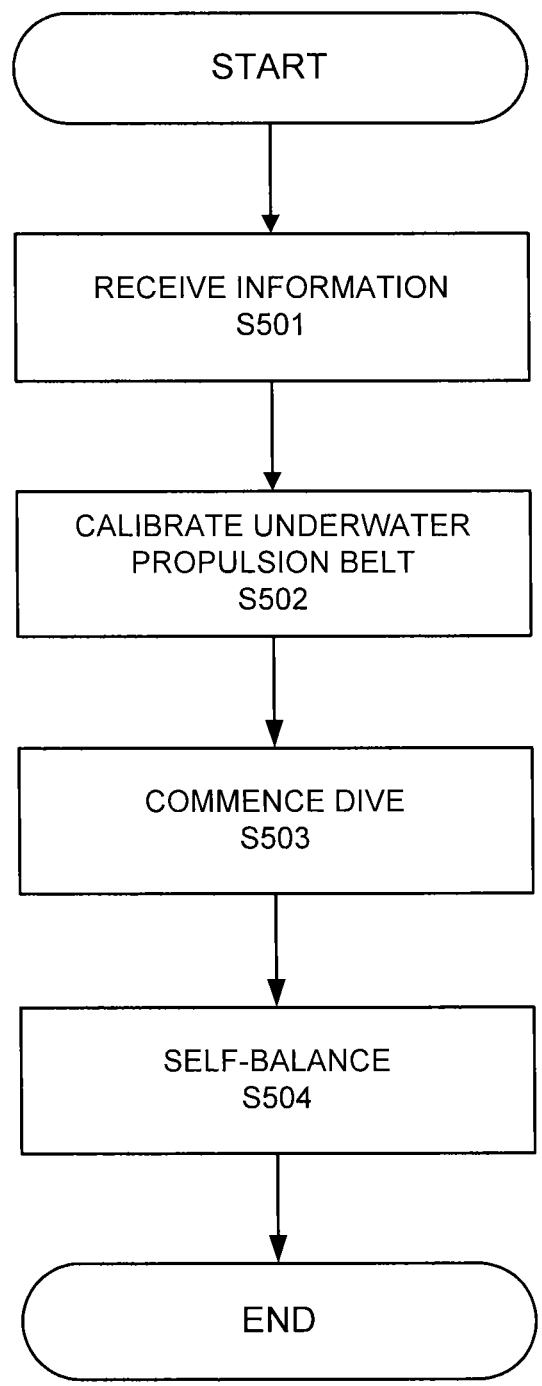
FIG. 5 illustrates a flow chart describing the process by which the underwater propulsion belt propels a user and maintains the user's balance.

Next, FIG. 5 illustrates an exemplary algorithmic flowchart for executing movement of the user according to one aspect of the present disclosure. The hardware description above and in FIG. 6, constitutes or includes specialized corresponding structure that is programmed or configured to perform the algorithm shown in FIG. 5. For example, the algorithm shown in FIG. 5 may be completely performed by circuitry included in the underwater propulsion belt 100 shown in FIG. 1 or the programmable chip 140 as shown in FIG. 1.

FIG. 5 illustrates an exemplary algorithmic flowchart of how the underwater propulsion belt 100 functions. In step S501, the circuitry receives information in order for the underwater propulsion belt 100 to direct the user underwater. For example, the circuitry receives user information such as, weight, height, body-mass index, waist measurement, disabilities such as missing limbs, etc.

In addition, the circuitry can receive information about diving conditions and additional diver information from a plurality of sensors. The underwater propulsion belt may be equipped with a receiver for receiving the information from the sensors, the receiver is the type that could be purchased or manufactures as would be understood by one of ordinary skill in the art. The sensors can be on the underwater propulsion belt 100 or other devices that can communicate the information to the underwater propulsion belt 100. In selected embodiments, sensors include at least one of: water pressure, air cylinder pressure, estimated breather gas supply, air cylinder composition (oxygen concentration, nitrogen concentration, helium concentration, carbon dioxide concentration, carbon monoxide concentration, etc.), water temperature, air temperature, timer (time stamps, stopwatch, clock time, date), depth, altitude, turbidity, salinity, battery condition, diver vitals (ECG, EEG, respiration rate, core body temperature, skin temperature, etc.). The types of sensors are those that could be purchased or manufactured as would be understood by one of ordinary skill in the art.

In addition, the circuitry receives information for a specific use, such as a specific dive plan or predetermined route. If the dive is occurring in a swimming pool, the dimensions of the swimming pool are programmed and a predetermined route is determined based on the dimensions of the swimming pool. FIG. 2 illustrates a predetermined route based on a dive in a swimming pool. If the predetermined route in not in a pool but in a body of water, the predetermined route can be based on GPS coordinates. The circuitry can also be programmed with specific dive plans which include planned dive depths and the planned length of the dive at certain depths.

Alternatively, instead of a specific predetermined route, the underwater propulsion belt can be controlled by a remote control 130, as explain previously. The remote control can be controlled by the user, or alternatively, by a dive master supervising the dive.

After the circuitry has received the initial information to begin the dive, the user with the underwater propulsion belt attached properly enters the water. When the user enters the water and once the user is at neutral buoyancy, the underwater propulsion belt can be calibrated in step S502. Through the use of the accelerometer, the user's orientation can be determined has the belt can be calibrated based on a neutral buoyancy of the diver and the diver's orientation.

Once the underwater propulsion belt 100 has been calibrated, the user can begin the dive. For example, in step S503, the dive can commence by the underwater propulsion belt beginning to execute the predetermined route, or the user or the dive master can begin to use the remote control. The underwater propulsion belt 100 controls the forward and backwards movement of the diver as well as the rotational movement. As discussed above, the movement is controlled by direction that the water flows through the channels, the size or diameter of the first gate end and the second gate end, the number of gates pumping water, and the speed of the water passing through the channels, etc.

In step S504, the underwater propulsion belt executes the self-balancing control system to maintain the balance of the diver. The circuitry calculates the user's position based on whether the user is in an upright position or a prone position. The user's position is in respect to the planar surface of the water. The self-balance control system maintains the diver's balance by controlling the direction the water is pumped in each of the channels, the number of pumps in operation, and the speed at which the water is pumped in each of the channels in relation to the accelerometer reading, etc. Any sudden movements by the user and can be compensated by the self-balance control system in order to maintain the user's balance.

The information from the sensors discussed above may be incorporated into the self-balance control system to provide additional information in order to calculate the user's position in order for the underwater propulsion belt 100 to maintain the user's balance.

The user's balance may be maintained by calculating the user's position to determine whether the use is substantially in an upright or prone position. The underwater propulsion belt is controlled by direction that the water flows through the channels, the size or diameter of the first gate end and the second gate end, the number of gates pumping water, and the speed of the water passing through the channels, etc.

Figure 6:
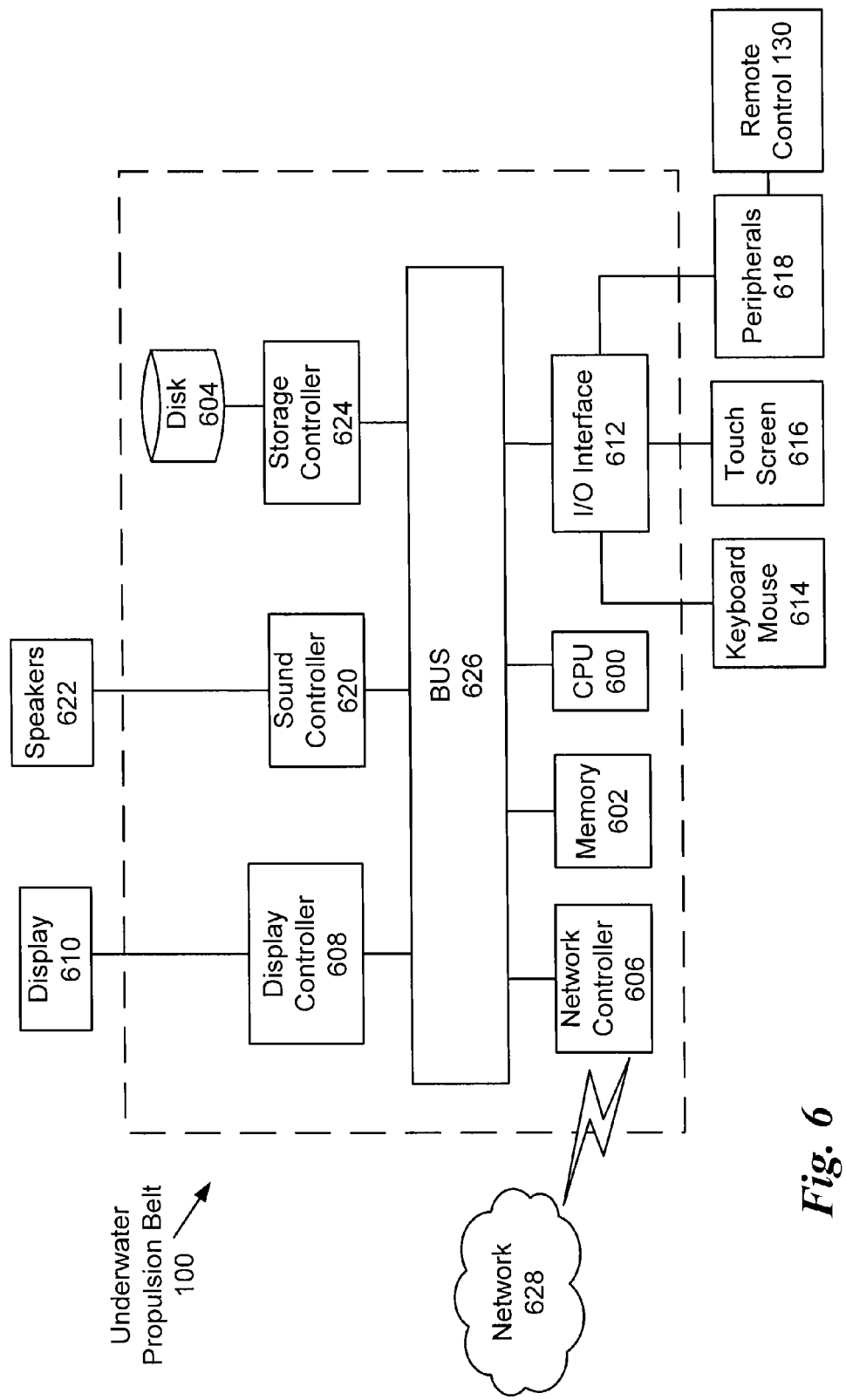
FIG. 6 illustrates a hardware device configuration of the underwater propulsion belt according to one example.

Next, a hardware description of the underwater propulsion belt 100 according to exemplary embodiments is described with reference to FIG. 6. In FIG. 6, the underwater propulsion belt 100 includes a CPU 600 which performs the processes described above. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the underwater propulsion belt 100 communicates, such as a server or computer.

Further, the claimed advancements may be provided as a utility application, background daemon, or component of an operating system, or combination thereof, executing in conjunction with CPU X00 and an operating system such as Microsoft Windows 7, UNIX, Solaris, LINUX, Apple MAC-OS and other systems known to those skilled in the art.

The hardware elements in order to achieve the underwater propulsion belt 100 may be realized by various circuitry elements, known to those skilled in the art. For example, CPU 600 may be a Xenon or Core processor from Intel of America or an Opteron processor from AMD of America, or may be other processor types that would be recognized by one of ordinary skill in the art. Alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the inventive processes described above.

The underwater propulsion belt 100 in FIG. 6 also includes a network controller 606, such as an Intel Ethernet PRO network interface card from Intel Corporation of America, for interfacing with network 628. As can be appreciated, the network 628 can be a public network, such as the Internet, or a private network such as an LAN or WAN network, or any combination thereof and can also include PSTN or ISDN sub-networks. The network 628 can also be wired, such as an Ethernet network, or can be wireless such as a cellular network including EDGE, 3G and 4G wireless cellular systems, or acoustic modem. The wireless network can also be WiFi, Bluetooth, or any other wireless form of communication that is known.

The underwater propulsion belt 100 further includes a display controller 608, such as a NVIDIA GeForce GTX or Quadro graphics adaptor from NVIDIA Corporation of America for interfacing with display 610 when on land, such as a Hewlett Packard HPL2445w LCD monitor. A general purpose I/O interface 612 interfaces with a keyboard and/or mouse 614 as well as a touch screen panel 616 on or separate from display 610. Peripherals 618, such as the remote control 130 interfaces with the general purpose I/O interface 612.

A sound controller 620 is also provided in the underwater propulsion belt 100, such as Sound Blaster X-Fi Titanium from Creative, to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the underwater propulsion belt 100.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The above-described hardware description is a non-limiting example of corresponding structure for performing the functionality described herein.

Obviously, numerous modifications and variations of the present invention are possible in light of the above teachings. It is therefore to be understood that within the scope of the appended claims, the invention may be practiced otherwise than as specifically described herein.

What is claimed is:

1. An underwater propulsion belt configured to propel a user underwater comprising:
    a belt with a plurality of gates, each gate having a first end and a second end with a channel therebetween, the first end and the second of each gate being offset;
    a plurality of pumps controlled independently from one another, each pump of the plurality of pumps having a respective gate of the plurality of gates;
    a power supply to power the plurality of pumps to pump water from either direction in the channel, either from the first end to the second end or from the second end to the first end; and
    circuitry configured to
        receive diver information from the user and from one or more sensors,
        control, based on the information, the direction in which the water is pumped in each of the channels, the number of pumps in operation, and a speed at which the water is pumped in each of the channels, to execute movement of the user,
        calculate a user's position to determine whether the user is substantially in an upright or prone position, and
        control, based on the calculation, the direction in which the water is pumped in each of the channels, the number of pumps in operation, and the speed at which the water is pumped in each of the channels, to maintain the user's balance.

2. The underwater propulsion belt according to claim 1, wherein a height of the underwater propulsion belt is greater than a width of the first end.

3. The underwater propulsion belt according to claim 1, wherein the first end of the gate has an aperture, and the second end of the gate has an aperture, and each aperture is not vertically aligned.

4. The underwater propulsion belt according to claim 1, wherein the power source is a rechargeable battery sealed in a waterproof container affixed to the underwater propulsion belt.

5. The underwater propulsion belt according to claim 2, wherein the one of more sensors include at least one of a depth sensor, a pressure sensor, an air temperature sensor, a water temperature sensor, a salinity sensor and a turbidity sensor.

6. The underwater propulsion belt according to claim 1, wherein the circuitry controls the movement of the underwater propulsion belt based on a programmed predetermined route.

7. The underwater propulsion belt according to claim 5, wherein
    the movement of the underwater propulsion belt is controlled by a remote control, and
    the remote control is operated by the user wearing the underwater propulsion belt or externally by a third party.

8. The underwater propulsion belt according to claim 7, wherein the remote control is operated by the user's feet.

9. The underwater propulsion belt according to claim 7, further comprising:
    an emergency button which when activated causes the circuitry to initiate ascension of the user to the surface by a predetermined rate of ascension to prevent nitrogen narcosis, decompression sickness, or lung overexpansion.

10. The underwater propulsion belt according to claim 9, wherein the emergency button when activated overrides the remote control.

11. The underwater propulsion belt according to claim 6, further comprising:
an emergency button which when activated causes the circuitry to terminate the programmed predetermined route and initiates ascension of the user to the surface by a predetermined rate of ascension to prevent nitrogen narcosis, decompression sickness, or lung overexpansion.

12. The underwater propulsion belt according to claim 10, wherein the underwater prolusion belt is integrated with a buoyancy control device (BCD).

13. The underwater propulsion belt according to claim 12, wherein, when the emergency button is activated, the circuitry controls a bladder within the BCD to be inflated to initiate the ascension of the user.

14. The underwater propulsion belt according to claim 13, wherein the plurality of pumps are impellers, each impeller being located substantially in the middle of a corresponding gate.

15. The underwater propulsion belt according to claim 13, wherein the user is alerted when the battery is low by either a visual, audio, or tactile alert.

16. The underwater propulsion belt according to claim 15, wherein the diver information is at least one of user height, weight, body-mass index, waist measurement, and missing limbs.

* * * * *